Sept. 11, 1923.  
W. M. JONES, JR  
METHOD OF VULCANIZING TREADS AND MOLD USED IN SUCH METHOD  
Filed Oct. 20, 1921

1,467,761

INVENTOR  
W. Martin Jones Jr.  
Davis & Simm  
ATTORNEYS

Patented Sept. 11, 1923.

1,467,761

UNITED STATES PATENT OFFICE.

WILLIAM MARTIN JONES, JR., OF ROCHESTER, NEW YORK.

METHOD OF VULCANIZING TREADS AND MOLD USED IN SUCH METHOD.

Application filed October 20, 1921. Serial No. 508,966.

*To all whom it may concern:*

Be it known that I, WILLIAM MARTIN JONES, Jr., a citizen of the United States, and resident of Rochester, in the county of Monroe and State of New York, have invented certain new and useful Improvements in Methods of Vulcanizing Treads and Molds Used in Such Methods, of which the following is a specification.

The present invention relates to a method of vulcanizing treads on previously formed tires and a mold used in such method, an object of this invention being to provide for placing a new tread on an old tire without damaging the tire during the process of vulcanizing such new tread.

In the retreading of old tires, it is now customary to apply the tread and then to subject substantially the entire tire to the vulcanizing temperature, so that all but the new tread becomes overvulcanized and the life of the tire is greatly shortened and the tire has to be abandoned while the new tread is still in good condition. According to this invention, the new tread on the tire is vulcanized, while the interior of the tire and the sides beyond the tread are protected against the action of the vulcanizing heat.

An apparatus for carrying out this method and forming part of the present invention is illustrated in the accompanying drawings, in which—

Figure 1:
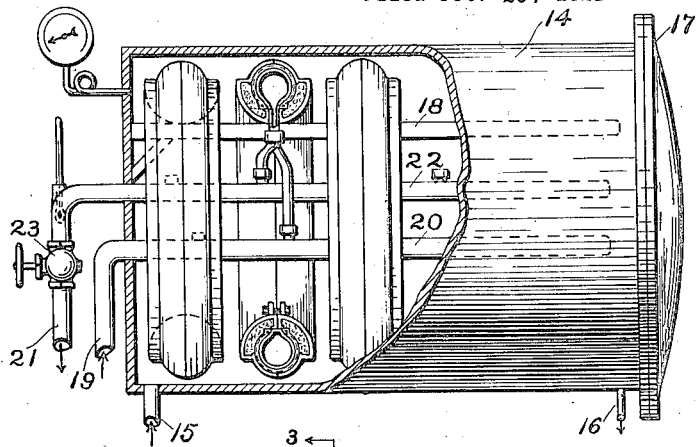
Fig. 1 is a view partially in section of the steam drum in which the tires are vulcanized, one of the molds being shown in section and the other molds being shown in edge elevation.
Figure 2:
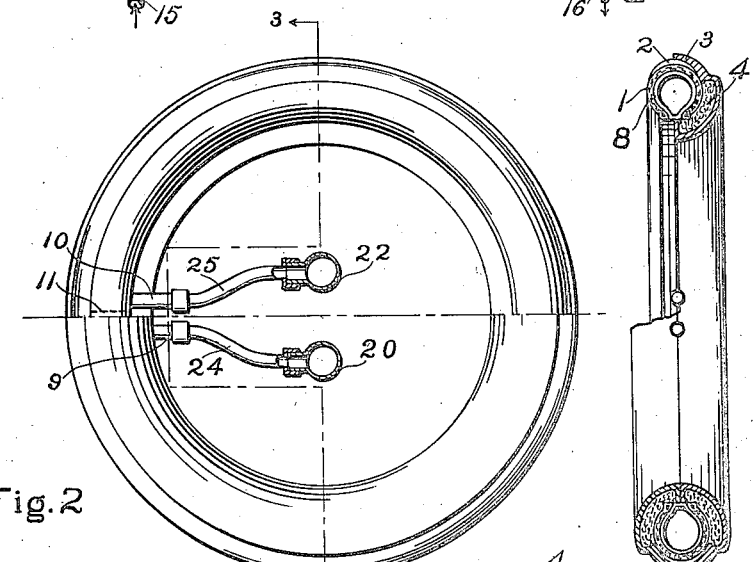
Fig. 2 is a face view of a mold showing the upper-half of one of the mold sections removed.
Figure 3:
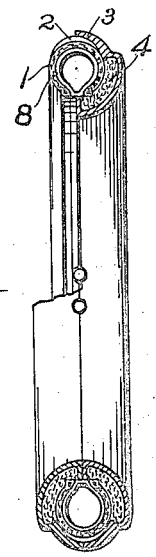
Fig. 3 is a section on the line 3—3, Fig. 2.

In the drawings, 1 indicates the previously formed tire and 2 the new tread to be vulcanized thereon. After the tread is applied in the usual position on the old tire, the latter with the new tread is introduced into the mold for the purpose of vulcanizing the new tread. The mold, in the illustrated embodiment, comprises a body in the form of a hollow annulus made in two sections, each section having a portion 3 for engaging with the newly formed tread 2, this portion in the embodiment illustrated in Fig. 3 gradually increasing in the thickness from the outer edge of the section or the central portion of the tread engaging part of the mold toward the sides of the tire. The purpose of this construction is to secure greater conductivity for the heat at the middle of the tread than at the sides, as the tread gradually decreases in thickness toward its sides. The tire is also supported exteriorly between the outer edge of the tread by portions of the mold. In this instance, each mold section has a chamber formed therein in which is received a material 4 of low heat conductivity, such for instance, as asbestos, which will have a surface formed to engage the tire between the beads thereof and the tread. The abutting inner edges of the two sections of the molds have inwardly turned flanges 5, and are also provided near their abutting inner edges with lugs 6 through which bolts 7 are passed for securing the two mold sections together.

For cooling the interior of the tire, a cooling core may be provided preferably in the form of an inflatable tube of annular form indicated at 8. This tube is inserted in the tire before the latter is inserted in the mold and in order to maintain the core in a cool state, a cooling fluid such as water is caused to pass continuously through the core during the vulcanizing process. With this end in view, the cooling core may be provided with an inlet nipple 9 and an outlet nipple 10, a dividing wall or partition 11 being arranged in the cooling core, so that a circulation in the cooling fluid is assured.

Figure 4:
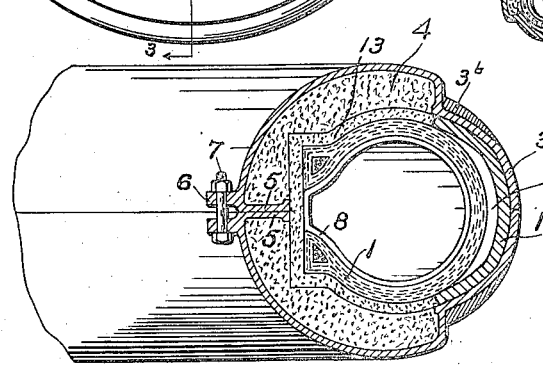
Fig. 4 is an enlarged section through the mold showing the reducing liner in position therein.

In the embodiment shown in Fig. 4, the tread engaging portion in each section is formed of metal 3ª such as aluminum of uniform thickness whereas each section has at 3ᵇ a cast-iron ring which acts as a partial insulator in connection with the aluminum and gradually increases in thickness from the edge nearest the central peripheral portion of the mold but is spaced from said central peripheral portion. This arrangement makes it possible to heat the central peripheral portion to greater temperature than the side portions, so that the central portion of the tread receives a greater heat than the side portions to allow for the greater thickness of the tread at this point. In this embodiment, there is employed a liner or reducer for reducing the size of the mold so as to accommodate the mold to tires of different sizes. A number of these reducers is provided to accommodate a number of different standard sizes of tires. This reducer or liner may have a metallic peripheral portion 12 for engagement with the tread 2, and an inner portion 13 formed of material of lower conductivity such as asbestos for engagement with the walls of the tire removed from the tread portion 2, so that the heat from the tread engaging portion 12 of the mold is not conducted to the inner portion 13. This liner may be formed in two annular sections like the mold.

The vulcanizing may be effected through any suitable heating means. There has been illustrated herein for this purpose, a steam heating drum 14 having an inlet 15 and an outlet 16 for the steam. This drum has a head 17 at one end adapted to be opened to permit the tires to be placed upon a supporting bar 18 arranged horizontally in the drum. So that a cooling fluid such as water may be supplied to the cooling cores of the tires during the vulcanizing process, an inlet pipe 19 connects with the drum and has an arm 20 extending horizontally therein. An outlet pipe 21 leads from the drum and has a branch 22 extending in such drum, a valve 23 being provided in the outlet pipe through which the flow of cooling fluid through the cooling cores may be controlled. Each cooling core connects with the inlet branch 20 and the outlet branch 22, these connections being established through detachable coupling pipes 24 and 25 respectively.

The operation of the constructions herein set forth is as follows: An old tire 1 has a new tread 2 applied thereto in the usual manner and a cooling core is inserted into the tire. The tire with the tread thereon is then placed in the mold by fitting it first in one section and then covering the tire with the other section. If the tire be too small for the mold a reducer or liner of proper size is fitted into the mold prior to the insertion of the tire. Any number of the molds is then introduced in the heating drum, each mold having its cooling core connected up to the fluid circulating means. The cover of the drum 14 is then closed and the drum is supplied with steam heat to produce a vulcanizing temperature for the tread. During vulcanizing, the greatest heat will be applied to the central portion of the perimeter, due to the fact, that the metal of the mold has greater heat conductivity at this point, being thinner at the central portion. From the central portion the heat conductivity decreases toward the opposite sides of the new tread, this being desirable as the tread decreases in thickness in opposite directions from the central portion thereof. Those portions of the mold which confine the tire on opposite sides of the tread are formed of a material which has a low heat conductivity, so that the tire exteriorly is not subjected to a vulcanizing heat except at the tread. Interiorly the tire is maintained in a cool state by a cooling core preferably of annular hollow construction through which a cooling fluid such as water is caused to pass. It is apparent that this invention makes it possible to retread old tires without destroying such tires by the vulcanizing heat used in retreading.

What I claim as my invention and desire to secure by Letters Patent is:

1. The method of vulcanizing treads on previously formed tires, which consists in subjecting the new tread to a vulcanizing heat on the exterior thereof, circulating a cooling fluid through the interior of the tire to prevent vulcanizing thereof, and insulating the exterior wall of the tire on opposite sides beyond the tread against the action of such vulcanizing heat.

2. The method of vulcanizing new treads on previously formed tires which consists in subjecting the new tread to a vulcanizing heat on the exterior thereof, maintaining the tire cool interiorly during such vulcanizing and insulating the exterior wall of the tire on opposite sides of the tread against the action of such vulcanizing heat.

3. The method of vulcanizing new treads on previously formed tires which consists in subjecting the new tread to a vulcanizing heat gradually decreasing toward the sides of the tread, maintaining the tire cool interiorly during such vulcanizing and insulating the exterior wall of the tire on opposite sides of the tread against the action of such vulcanizing heat.

4. A tire tread vulcanizing mold comprising a mold body having the tread engaging portion of its wall of greater heat conductivity than those portions of the wall away from the tread, and a cooling core arranged in the mold to fit within a tire in said mold body.

5. A tire tread vulcanizing mold comprising a mold body having the tread engaging portion of the wall formed of material having high heat conductivity and those portions away from the tread engaging portion formed of material having low heat conductivity.

6. A tire tread vulcanizing mold comprising a mold body having the tread engaging portion of the wall formed of material having high heat conductivity and those portions away from the tread engaging portion formed of material having low heat conductivity the tread engaging portion having greater heat conductivity at its central portion and gradually less conductivity from both sides of said central portion.

7. A tire tread vulcanizing mold comprising a mold body having the tread engaging portion of its wall of greater heat conductivity than those portions away from the tread engaging portion, and a liner for said mold having its tread engaging portion of greater heat conductivity than those portions away from the tread engaging portions.

8. A tire tread vulcanizing mold comprising a mold body having a tread engaging portion formed of material of high heat conductivity, and surfaces for engaging all the other parts of the exterior of the tire formed of asbestos.

WILLIAM MARTIN JONES, Jr.